United States Patent [19]

Takakarhu et al.

[11] Patent Number: 5,242,999
[45] Date of Patent: Sep. 7, 1993

[54] REGULATION METHOD FOR REGULATING THE TEMPERATURE IN A REACTOR UTILIZED IN THE POLYMERIZATION OF OLEFINES

[75] Inventors: Jouni Takakarhu, Helsinki; Ari Palmroos, Kerava, both of Finland

[73] Assignee: Neste Oy, Finland

[21] Appl. No.: 890,912

[22] Filed: May 29, 1992

[30] Foreign Application Priority Data

May 30, 1991 [FI] Finland ................. 912603

[51] Int. Cl.$^5$ ............................................. C08F 2/02
[52] U.S. Cl. ........................................ 526/61; 526/67; 526/68; 422/138; 422/235
[58] Field of Search ...................... 526/68, 61, 67; 422/138, 235

[56] References Cited

U.S. PATENT DOCUMENTS 4,249,907 2/1981 Callejas ................. 23/230 A
4,742,131 5/1988 Asanuma et al. ................. 526/61

Primary Examiner—Joseph L. Schofer
Assistant Examiner—David Wu
Attorney, Agent, or Firm—Steinberg & Raskin

[57] ABSTRACT

The invention relates to a regulation method for regulating the temperature in a reactor utilized in the polymerization of olefines. A circulating gas is led to the reactor along a circulating gas flow line, and the circulating gas is cooled by leading part of the circulating gas flowing along a circulating gas flow line along a by-pass flow line through a cooler. A regulating device for the circulating gas inlet-flow temperature controls the amount of the circulating gas by-pass flow along a circulating gas by-pass flow line through the cooler such that the sum of the openings of a valve in the circulating gas flow line and a valve in the circulating gas by-pass flow line is maintained substantially constant in the range from about 90 to about 120%.

13 Claims, 2 Drawing Sheets

REGULATION METHOD FOR REGULATING THE TEMPERATURE IN A REACTOR UTILIZED IN THE POLYMERIZATION OF OLEFINES

BACKGROUND OF THE INVENTION

The invention relates to a regulation method for regulating the temperature in a reactor utilized in the polymerization of olefines, in which method a circulating gas is led to the reactor along a circulating gas flow line. The circulating gas is cooled by leading the circulating gas through a cooler before it enters the reactor.

In the methods known from prior art, the circulating gas is led to the reactor via a straight pipe line provided with a cooler. This known regulation method is extremely slow, because the temperature of the circulating gas can not rapidly be changed.

OBJECTS AND SUMMARY OF THE INVENTION

An object of the invention is to provide an improvement in the currently known reactor temperature regulating methods.

This object of the invention and others are achieved by means of a regulation method, in which is a circulating gas is cooled by leading part of the circulating gas flowing along a circulating gas flow line along a by-pass flow line through a cooler. A regulating device for the circulating gas inlet-flow temperature controls the amount of the circulating gas by-pass flow along a circulating gas by-pass flow line through a cooler. This device operates such that the sum of the openings of a valve in the circulating gas flow line and a valve in the circulating gas by-pass flow line is maintained essentially constant in the range from about 90% to about 120%.

The inventive regulation method provides certain important advantages. For example, the inventive regulating method makes a rapid regulating possible, because the temperature of the circulating gas may be changed sufficiently rapidly. When the valve is controlled according to the inventive method, no detrimental fluctuations occur in the inlet flow of the circulating gas into the reactor. The sum of the openings of the valves is always maintained essentially constant in the range from about 90% to about 120%. On the basis of practical experience, a preferable range is from about 105% to about 115%, and the most preferable value is reached in the range of about 110%.

The inventive regulation method also provides for the reactor 10 more flexibility for producing various polyolefines within a wide operating range of the reactor conditions.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
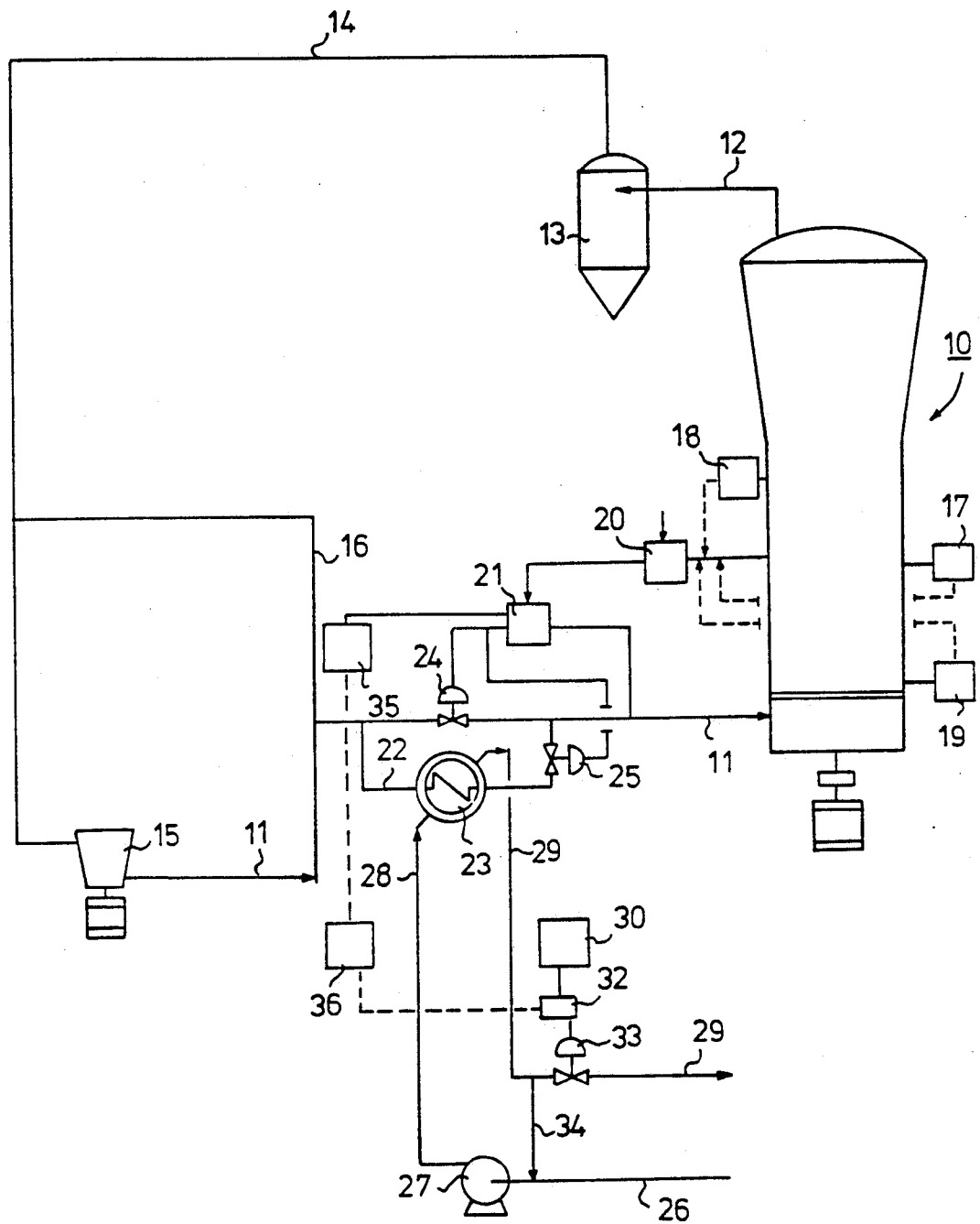
FIG. 1 shows as a process flowchart a circulating gas reactor utilized in the polymerization of olefines.

In FIG. 1, a circulating gas reactor utilized in the polymerization of olefines is generally referred to by a reference number 10. A circulating gas flow line 11 leads to the reactor 10. The circulating gas exits from the reactor 10 along a circulating gas return flow line 12 to a separator 13, which is preferably a cyclone separator, and further along a line 14 back to a circulating gas compressor 15. A partial flow may be, when so desired, led from the circulating gas flow line 11 leading to the reactor 10 as a cyclic flow along a flow line 16 back to the circulating gas compressor 15.

The temperature of the reactor 10 is measured by means of one or more temperature measuring devices. FIG. 1 shows temperature measuring devices 17, 18 and 19. The temperature regulating device of the reactor 10 is referred to by a reference number 20.

The temperature regulating device 20 of the reactor 10 controls a circulating gas inlet-flow temperature regulating device 21. The circulating gas is cooled by leading part of the circulating gas flowing along the flow line 11 along a by-pass flow line 22 through a cooler 23. The circulating gas flow line 11 is provided with a valve 24 and the by-pass flow line 22 passing through the circulating gas cooler 23 is provided with a valve 25.

A cooling medium flows along a feeding line 26 to a pump 27 and further along a flow line 28 to the cooler 23. The heated cooling medium exits from the cooler 23 along a return flow line 29. The return line 29 is provided with a valve 33, and by regulating this valve 33, part of the heated cooling medium may be led along a flow line 34 as a cyclic flow back to the cooling cycle.

The inventive regulation method is as follows. The reactor 10 is cooled by means of the circulating gas cooler 23 for removing the polymerization heat. The temperature regulating device 20 of the reactor 10 provides a set value for the circulating gas inlet-flow temperature regulating device 21. The circulating gas inlet-flow temperature regulating device 21 controls the amount of the by-pass flow along the circulating gas by-pass flow line 22 through the cooler 23. This is achieved by controlling the opening of the valves 24 and 25 such that the sum of the openings of the valves 24 and 25 is always essentially constant, preferably 110%. The temperature of the cooling medium may be adjusted in two alternative ways.

In the first way, a set value is provided for the temperature of the heated cooling medium leaving from the cooler 23. A cooling-medium return-flow temperature regulating device 30 regulates the temperature of the heated returning cooling medium by omitting part of the heated medium flow from a cyclic flow 29, 34 and 28 and by substituting it for a cold cooling medium. The amount of the cooling medium passing through the circulating gas cooler 23 is maintained substantially constant.

This way is preferable, when the circulating gas contains a substantial amount of heavy components, which tend to condensate, and if the temperature of the circulating gas is too low. This way provides for the temperature of the circulating gas a minimum value.

In the second way, a set value of the opening of the valve 24 is transmitted to a monitor 35. If the position value of the opening valve 24 deviates from the set value of the opening of the valve 24, the set value of a cooling-medium inlet-flow temperature regulating device 36 changes, too, whereby the position value of the opening of the valve 24 again returns to its set value. This function is relatively slow, and it does not cause any disturbances for the circulating gas inlet-flow temperature regulating device 21. The cooling-medium inlet-flow temperature regulating device 36 regulates the temperature of the cooling medium by omitting part of the heated cooling medium leaving the cooler 23 from the cyclic flow 29, 34 and 28 and by substituting it for a cold cooling medium.

This way is preferable, when there are not limitations to the temperature of the cooling medium. In this manner, the valves 24 and 25 are allowed to be maintained approximately in their optimal positions during the entire period of time; e.g., the valve 24 is open by 70% and the valve 25 is open by 40%. The valves 24 and 25 may yet be in the range to be regulated, and the valve 25 still is relatively much capable of opening more, which it will if needed and thereby increase the cooling capacity of the circulating-gas cooler 23.

In FIG. 1, a reference number 32 refers to a switch, which is controlled by the cooling-medium return-flow temperature regulating device 30 and correspondingly a cooling-medium inlet-flow temperature regulating device 36. The switch 32 in turn controls the valve 33 in the return flow line 29.

Figure 2:
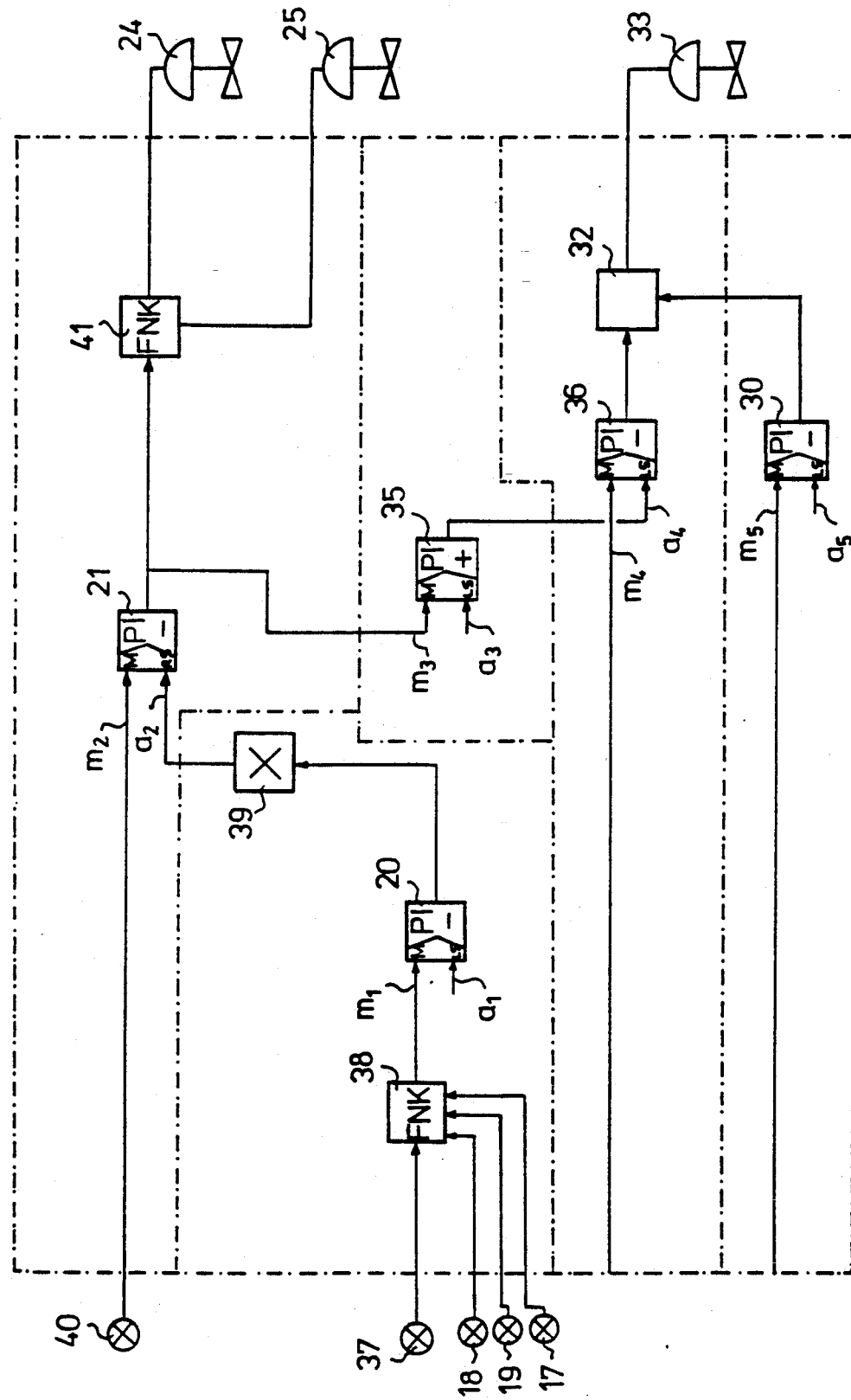
FIG. 2 shows as a block diagram a certain preferred embodiment of an inventive regulation method.

As is apparent from the block diagram of FIG. 2, the temperature of the reactor 10 is measured by means of any of the four temperature measuring devices 17, 18, 19 and 36. The temperature measuring signals are transmitted via a function means 38 as a measuring value $m_1$ to the temperature regulating device 20 of the reactor 10. The set value of the temperature regulating device 20 of the reactor 10 is referred to by a letter $a_1$. The outlet of the temperature regulating device 20 of the reactor 10 is transmitted via a multiplication operator 39 as a set value $a_2$ to the cooling-medium inlet-flow temperature regulating device 21.

A temperature measuring device measures the temperature of the circulating gas flowing in the circulating gas flow line 11 and provides a measuring value $m_2$ for the circulating gas inlet-flow temperature regulating device 21. The outlet of the circulating gas inlet-flow temperature regulating device 21 is transmitted to a function means 41, which controls the position of the valves 24 and 25.

The outlet of the circulating gas inlet-flow temperature measuring device 21 is transmitted to the monitor 35 as a measuring value $m_3$. The outlet $m_3$ is thus the current position value of the opening of the valve 24. A set value $a_3$ of the opening of the valve 24 is transmitted to the monitor 35. The outlet of the monitor is led to the cooling-medium inlet-flow temperature regulating device 36 as a set value $a_4$. A measuring value $m_4$ of the inlet flow temperature of the cooling medium is transmitted to the cooling-medium inlet-flow temperature regulating device 36. The outlet of the cooling-medium inlet-flow temperature regulating device 36 controls via the switch 32 the valve 33 in the return flow line 29.

A set value $a_5$ is transmitted to the cooling-medium return-flow temperature regulating device 30, and a set value $m_5$ of the return-flow temperature of the cooling medium is transmitted to the regulating device 30. The outlet of the cooling-medium temperature regulating device 30 is transmitted via the switch 32 as a control for the valve 33 in the return flow line 29.

The examples provided above are not meant to be exclusive. Many other variations of the present invention would be obvious to those skilled in the art, and are contemplated to be within the scope of the appended claims.

What is claimed is:

1. A regulation method for regulating the temperature in a reactor having a temperature regulating device, said reactor utilized in the polymerization of olefines, comprising
    flowing a circulating gas along a circulating gas flow line to a reactor,
    separating a portion of the circulating gas as a by-pass flow into a by-pass flow line from said circulating gas flow line before the circulating gas enters said reactor, said by-pass flow flowing through a cooler,
    flowing said by-pass flow through a first valve after said by-pass flow leaves said cooler,
    flowing said circulating gas flow through a second valve after said by-pass flow is separated from said circulating gas flow, and
    combining said by-pass flow and said circulating gas flow after said by-pass flow and said circulating gas flow respectively and before said by-pass flow and said circulating gas flow enter into said reactor, such that the sum of openings of said first valve and said second valve is maintained substantially constant, and
    controlling said sum of openings of said valves via a circulating gas inlet flow temperature regulating device.

2. The regulation method of claim 1, further comprising
    providing a cooling medium flow to an entrance of said cooler,
    replacing part of the cooling medium flow entering into said cooler with cooling medium returning from said cooler,
    regulating the replacement of the cooling medium flow with the cooling medium returning from said cooler via a cooling medium return flow temperature regulating device,
    providing a set value for the cooling medium return flow temperature regulating device, and transmitting a measured value of the temperature of said cooling medium return flow to said cooling medium return flow temperature regulating device,
    substituting part of said returning cooling medium flow from said cooler for the cooling medium via said cooling medium return flow temperature regulating device, thereby regulating the temperature of the returning cooling medium.

3. The regulation method of claim 2, further comprising providing a valve for controlling the flow of cooling medium return flow into said cooler, and regulating opening and closing of said valve via information transmitted from said cooling medium return flow temperature regulating device.

4. The regulation method of claim 1, further comprising
    providing a cooling medium flow to an entrance of said cooler,
    replacing part of the cooling medium flow entering into said cooler with cooling medium returning from said cooler,
    regulating the replacement of the cooling medium flow with the cooling medium returning from said cooler via a cooling medium inlet flow temperature regulating device,
    providing a set value for the cooling medium inlet flow temperature regulating device, and transmitting a measured value of the temperature of said cooling medium inlet flow to said cooling medium inlet flow temperature regulating device, substituting part of said returning cooling medium flow from said cooler for the cooling medium via said cooling medium inlet flow temperature regulating device, thereby regulating the temperature of the cooling medium.

5. The regulation method of claim 4, further comprising providing a valve for controlling the flow of cooling medium return flow into said cooler, and regulating opening and closing of said valve via information transmitted from said cooling medium inlet flow temperature regulating device.

6. The regulation method of claim 4, further comprising transmitting a set value of an opening of said second valve of said circulating gas flow line to a monitor, and transmitting a position value of the current opening of said second valve to said monitor, such that when said position value deviates from said set value of said opening of said valve, set value of said cooling medium inlet flow temperature regulating device changes such that said position value returns to said set value of said opening of said valve.

7. The regulation method of claim 4, further comprising the step of pumping said returning cooling medium flow to said cooler.

8. The regulation method of claim 1, further comprising providing a temperature regulating device for said reactor, transmitting a set value from said temperature regulating device of said reactor to said circulating gas inlet flow temperature regulating device, measuring the temperature of the circulating gas flowing in said circulating gas flow line, providing said measured temperature as a measured value to said circulating gas inlet flow temperature regulating device, and controlling the position of said first valve and said second valve utilizing the values transmitted to said circulating gas inlet flow temperature regulating device.

9. The regulation method of claim 1, further comprising the steps of:

circulating the circulating gas through said reactor, removing the circulating gas from said reactor along a circulating gas return flow line, conducting said circulating gas return flow line to a separator, conducting said circulating gas return flow line from said separator to a circulating gas compressor, directing the circulating gas from said circulating gas compressor into said circulating gas flow line, and removing a portion of the circulating gas in said circulating gas flow line as a cyclic flow back to said circulating gas compressor.

10. The regulation method of claim 1, further comprising measuring the temperature of said reactor by means of one or more temperature measuring devices.

11. The regulation method of claim 1, wherein said sum of openings of said first valve and said second valve is maintained in the range from about 90% to about 120%.

12. The regulation method of claim 11, wherein said sum of openings of said first valve and said second valve is maintained from about 105% to about 115%.

13. The regulation method of claim 11, wherein said sum of openings of said first valve and said second valve is maintained at about 110%.

* * * * *